United States Patent [19]

Earle

[11] Patent Number: 5,074,175
[45] Date of Patent: Dec. 24, 1991

[54] BICYCLE BRAKE ADJUSTING TOOL

[76] Inventor: Delbert L. Earle, 2411 Skyline Way #204, Anacortes, Wash. 98221

[21] Appl. No.: 575,437

[22] Filed: Sep. 24, 1990

[51] Int. Cl.⁵ .................................................. B25B 7/12
[52] U.S. Cl. ........................................ 81/302; 81/484
[58] Field of Search ................................. 81/302, 484

[56] References Cited

U.S. PATENT DOCUMENTS

| | | | |
|---|---|---|---|
| 3,540,106 | 11/1970 | Goldman | 81/302 X |
| 3,874,256 | 4/1975 | Korb et al. | 81/484 |
| 4,509,392 | 4/1985 | Smith | 81/302 X |
| 4,571,808 | 2/1986 | King | 81/302 X |

*Primary Examiner*—James G. Smith

[57] ABSTRACT

A hand tool for use in adjusting caliper type bicycle brakes. Said tool consists of a brake clamping device and a pivotal lever to first remove slack cable and then apply and hold cable tension against the brake suspension plate while the brake cable lock nut is tightened. Thereby obtaining correct brake adjustment. Said tool may then be used to trim excess cable length.

2 Claims, 4 Drawing Sheets

BICYCLE BRAKE ADJUSTING TOOL

BACKGROUND OF THE INVENTION

The present invention relates to a devise for adjusting brakes on bicycles using the caliper type braking system.

Periodically, bicycle brakes require readjustment or complete cable and housing replacement thru normal usage.

This devise is designed to be used by non-technically trained mechanics to maintain their bicycles in a safe operating condition without damaging brake components.

Bicycle caliper brake adjustment is an exacting task, if the cable tension is set too loose, necessary stopping power is not available and the biker may be in danger of injury, on the other hand, if the cable tension is set too tight, the brake will drag, causing unnecessary effort for the biker to propel the bicycle and rapid wear of the brake pads.

Most bikers are not expert mechanics, but do attempt to adjust their own bikes, this is usually accomplished by loosening the cable lock nut, gripping the brake cable with a pair of pliers and twisting the cable to obtain the necessary tension against the brake suspension plate, this normally provides the correct brake adjustment, however, the brake cable is frayed and distorted severely by the twisting motion of the pliers, rendering the cable is such a condition that further brake adjustment is difficult and dangerous as the many loose ends of the frayed cable can cause puncture wounds when brake adjustment is attempted.

There is a need for a simple, easy to use devise to obtain correct brake adjustment for both center pull and side pull caliper brakes.

PRIOR ART

Kenny disclosed a Bicycle Caliper Brake Adjusting tool. U.S. Pat. No. 4,823,919 (Oct. 13, 1987). Kenny achieved brake adjustment by inserting the brake cable thru the tool and clamping the brake cable on the lower or bottom end of said tool by a wing nut, a threaded, knurled insert within said tool is then rotated causing tension against the cable suspension plate, thereby removing slack cable and enabling brake adjustment. Because said brake cable end normally frays somewhat after initial adjustment, said tool is inadequate to use for subsequent adjustment, as it is difficult, if not impossible to thread said cable thru the tool passage, preventing proper tool installation. In addition, after initial brake cable installation, the excess cable extending beyond said cable suspension plate is normally cut off, leaving approximately one half inch (13 MM) of cable extending beyond said cable suspension plate. Said tool disclosed by Kenny is of too long a length to allow clamping by said wing nut and subsequent proper tool installation, rendering the tool inoperative for future brake adjustment.

Korb disclosed a bicycle caliper brake adjusting tool U.S. Pat. No. 3,874,256 (Apr. 1, 1975).

Said tool is positioned between the brake calipers and the brake caliper suspension plate. A nut is rotated on the tool which will cause a force to be applied to said compression plate, thereby removing slack cable and adequately positioning said tool. The suspension plate locknut is then loosened, allowing further rotation of said tool nut, thereby causing said brake calipers to rotate towards the bicycle tire rim until correct adjustment is obtained.

Whereas this prior art will provide an adequate adjustment on a center pull caliper brake, it will not perform on a side pull caliper brake.

SUMMARY OF THE INVENTION

Without having to obtain the services of a bike repair shop or professional bike mechanic, it is the objective of the invention to:

1. Provide a method to adjust bicycle caliper brakes accurately without distortion and major fraying of the brake cable during initial brake cable installation or readjustment.
2. Provide a tool which is capable of brake adjustment for both center pull and side pull caliper brakes.
3. Provide a tool capable of performing brake adjustment with a short cable end of approximately one half inch (13 MM).
4. Provide a tool which will prevent puncture wound injuries from frayed brake cable ends during bicycle brake readjustment.
5. Provide a tool capable of trimming excess brake cable length.

DESCRIPTION OF THE PREFERRED EMBODIMENTS

Figure 1:
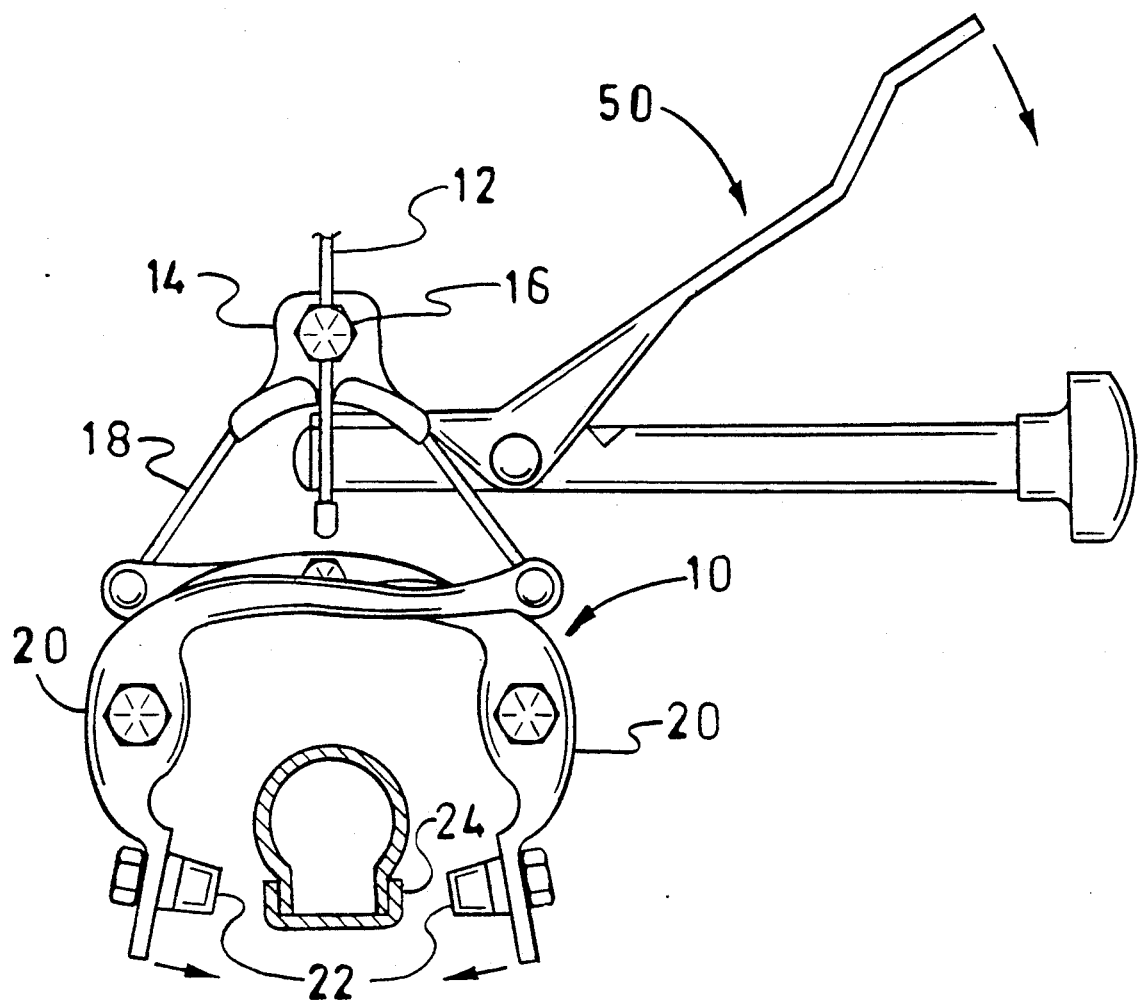
FIG. 1 is a plan view of a typical bicycle center pull caliper brake devise, actuation cable and bicycle wheel, with the instant invention installed in preparation of brake adjustment.

Referring to the drawing, specifically to FIG. 1, a center pull caliper brake system 10 is illustrated, with the bicycle brake adjusting tool 50 shown in preparation of brake adjustment.

Brake system 10 comprises brake actuation cable 12 secured to the brake suspension plate 14 by the brake cable lock 16, suspension cable 18 attached to brake caliper arms 20, brake pads 22 and bicycle wheel rim 24.

Slowing or stopping the bicycle is achieved by the bicycle operator energizing the hand brake operating lever providing a means for said actuating cable 12 to exert an upward pull of said suspension plate 14 resulting in a tension force being applied to said suspension cable 18, providing the means for said brake calipers 20 to rotate, thereby engaging said brake pads 22 with said bicycle wheel rim 24, creating frictional braking force to slow or stop said bicycle.

Figure 2:
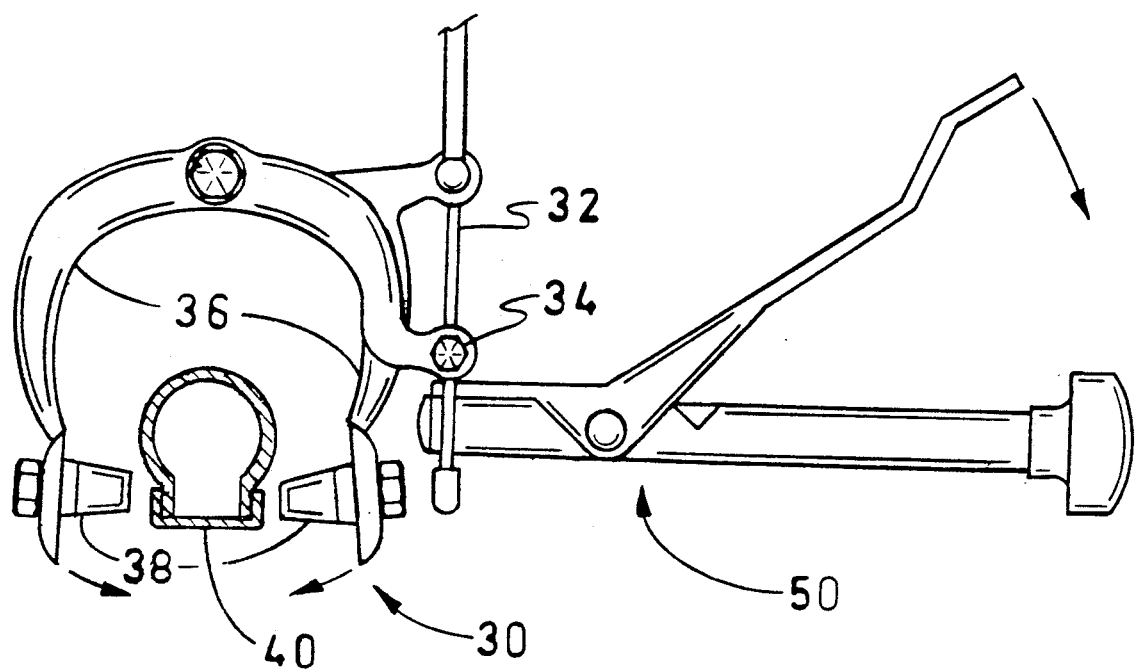
FIG. 2 is a plan view of a typical bicycle side pull caliper brake devise, actuation cable and bicycle wheel, with the instant invention installed in preparation of brake adjustment.

Referring to the drawing, specifically to FIG. 2. A side pull, dual caliper brake system 30 is illustrated, with the bicycle brake adjusting tool 50 shown in preparation of brake adjustment.

Brake system 30 comprises brake actuation cable 32, brake cable lock 34, brake caliper arms 36, brake pads 38 and bicycle wheel rim 40.

Slowing or stopping the bicycle is achieved by the bicycle operator energizing the hand brake operating lever which provides a means for said actuating cable 32 to exert an upward pull against said brake caliper arm 36, providing the means for said brake caliper arm 36 to rotate, thereby engaging said brake pads 38 with said bicycle wheel rim 40 and creating frictional breaking force to slow or stop said bicycle.

Figure 3:
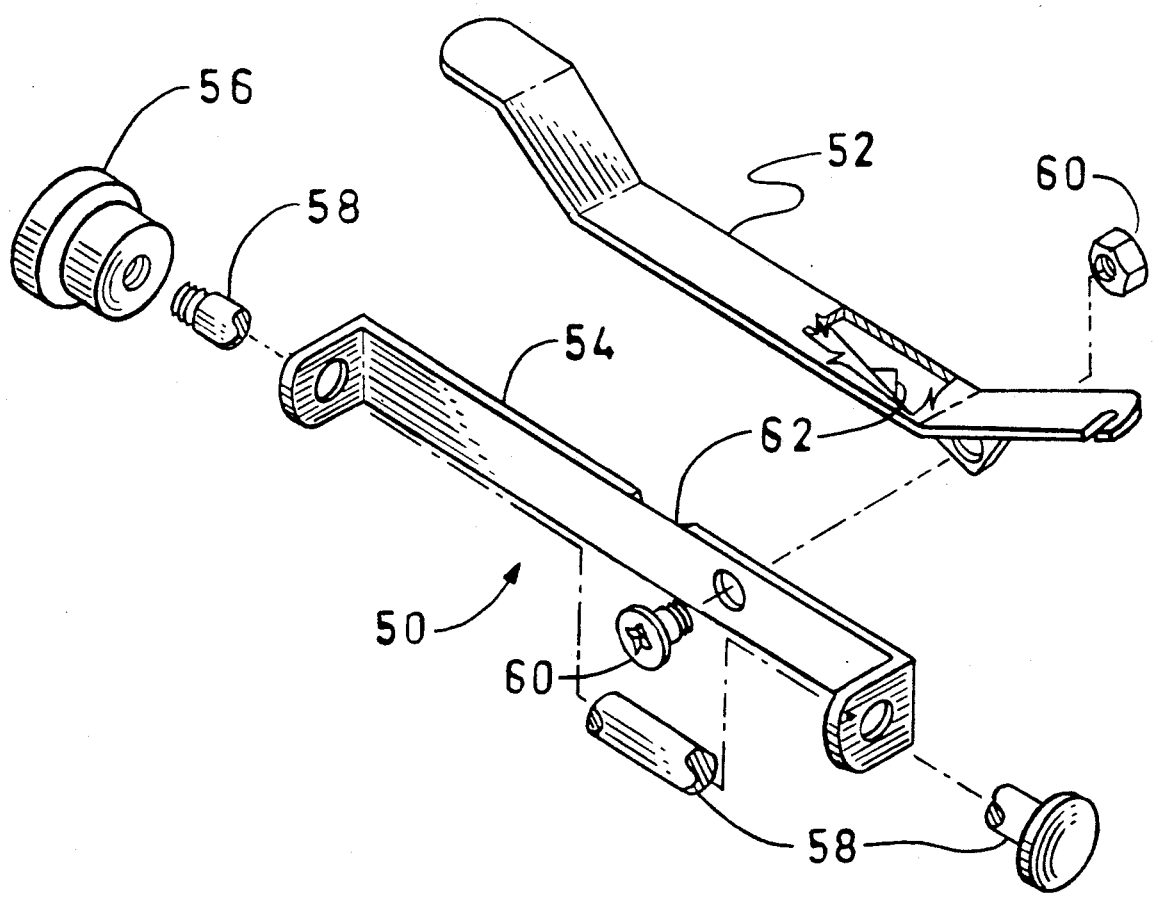
FIG. 3 is an isometric plan of the tool components and their relative position and assembly technique.

Referring to the drawing, specifically to FIG. 3, showing the details of the instant invention and is referred to as numeral 50, comprising cable tension handle 52, clamp handle 54, clamp knob 56, cable clamp rod 58, cable tension handle pivot fastener 60 and brake cable cutting surfaces 62.

The purpose of this view is to show the specific details of said bike tool components.

Figure 4:
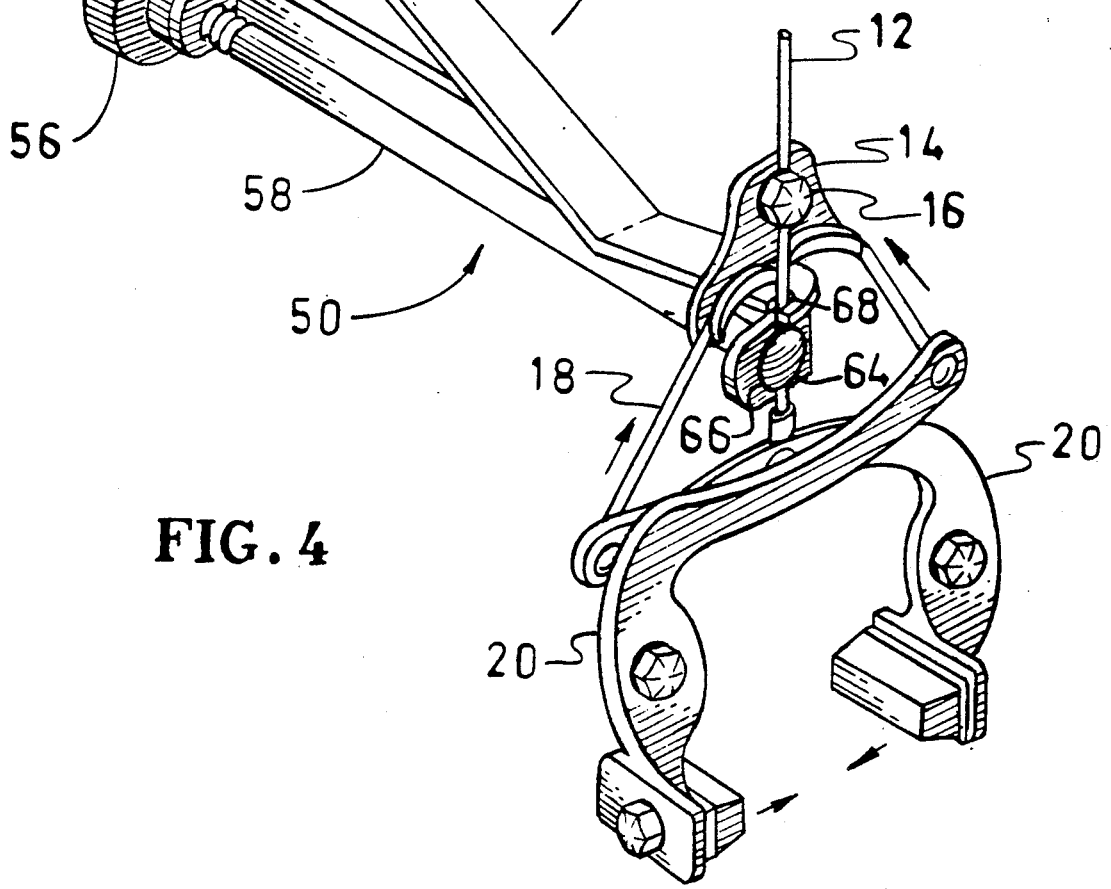
FIG. 4 is an isometric plan of the tool and it's relationship of installation to the bicycle brake components.

Referring to the drawing, specifically to FIG. 4, details the instant invention 50 and it's relationship of installation to bicycle brake actuation components.

Tool components comprise cable tension handle 52, clamp handle 54, clamp knob 56, cable clamp rod 58, cable gripping platform 64, cable clamping recess 66 and cable positioning slot 68. Bicycle brake components comprise actuating cable 12, suspension plate 14, cable lock 16 and suspension cable 18 and brake caliper arms 20.

Installation of said tool 50, on the center pull caliper brake system 10 (FIG. 1) is accomplished by backing off said clamp knob 56, thereby opening said cable clamp recess 66, said handles 52 and 54 are opened to widest position and said tool is positioned such that said actuating cable 12 is inserted into said cable clamping recess 66 and said cable positioning slot 68, said clamp, knob 56 is then tightened to securely clamp said actuating cable 12 against said cable gripping platform 64. Said brake cable lock is then loosened, compression is then applied to said tool handles 52 and 54, resulting in a compressive force reacting against said brake suspension plate 14 and said cable 12, clamped by said cable clamping recess 66, causing a tension force to be applied to said suspension cable 18 which in turn causes said brake caliper arms 20 to rotate inward until desired brake adjustment is obtained. Said brake cable lock 16 is then tightened, and said clamp knob 56 is loosened and said tool 50 is removed.

Installation and adjustment of the tool 50 on the side pull caliper brake system 30 (FIG. 2) is accomplished likewise.

Figure 5:
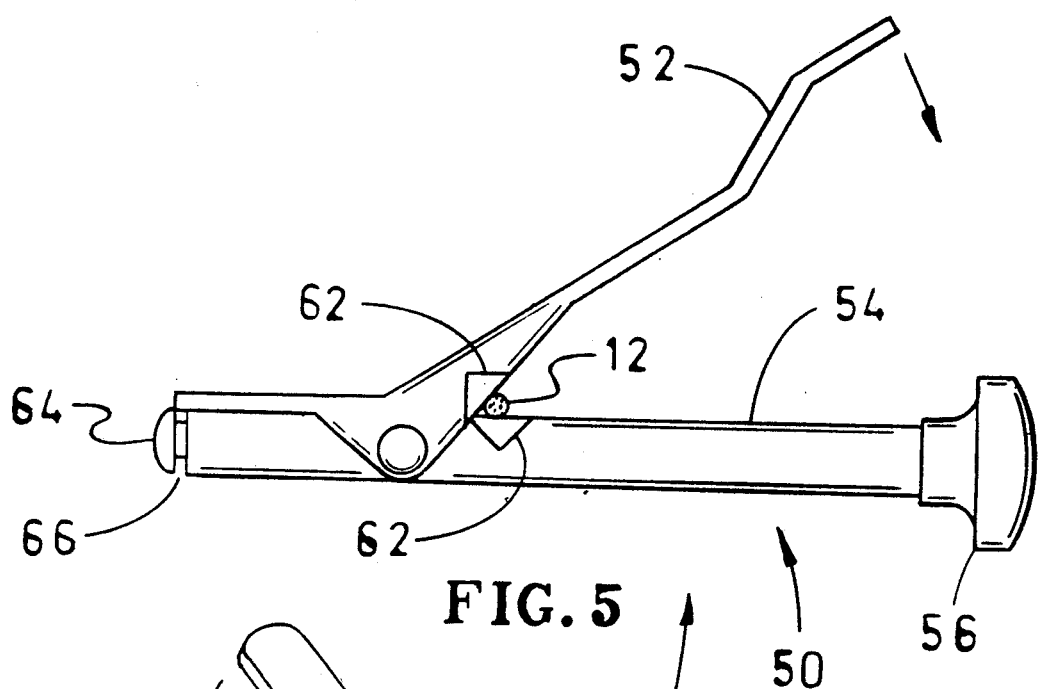
FIG. 5 is a plan view of the tool showing the relationship of the brake cable cutting feature.

Referring to the drawing, specifically to FIG. 5, details the instant invention 50 and it's relationship of the cable cutting feature, included in the view are the cable tension handle 52, clamp handle 54, clamp knob 56, brake cutting surfaces 62 cable gripping platform 64 and cable clamp recess 66. Bicycle component shown is the brake actuation cable 12.

Trimming of excess brake actuation cable 12 is accomplished by positioning said cable 12 adjacent to said cutting surfaces 62 and compressing said handles 52 and 54 until said cable 12 is severed.

The forgoing is considered as representative of the principle of the invention. Due to many methods and practices of manufacturing, is not intended to limit the invention to the exact construction displayed.

What I claim is:

1. A bicycle brake adjusting tool comprising;
   a first lever having a first jaw,
   a second lever having a second jaw, said first lever pivotally attached to said second lever,
   said second lever comprising body member and an elongated threaded shank slidable along said body member,
   one end of said elongated threaded shank having a gripping platform to engage a brake cable and another end of said elongated threaded shank having a manually rotatable knob,
   said first jaw comprising a slot to receive said brake cable,
   whereby said brake cable is placed between said body member and said gripping platform and gripped by rotation of said rotatable knob moving the threaded shank toward the body member,
   the brake cable is then placed in said slot in the first lever and said first lever is pivoted on said second lever to move the first jaw away from the second jaw.

2. A bicycle brake adjusting tool according to claim 1 further comprising;
   a first cutting surface on said first lever and a second cutting surface on said second lever, whereby excess cable can be trimmed off.

* * * * *